United States Patent
Gwilt (10) Patent No.: US 7,181,556 B2
(45) Date of Patent: Feb. 20, 2007

(54) TRANSACTION REQUEST SERVICING MECHANISM

(75) Inventor: David John Gwilt, Waterbeach (GB)

(73) Assignee: ARM Limited, Cambridge (GB)

( * ) Notice: Subject to any disclaimer, the term of this patent is extended or adjusted under 35 U.S.C. 154(b) by 246 days.

(21) Appl. No.: 10/743,537

(22) Filed: Dec. 23, 2003

(65) Prior Publication Data

US 2005/0138252 A1    Jun. 23, 2005

(51) Int. Cl.
  G06F 13/00   (2006.01)
  G06F 15/16   (2006.01)
  H04L 12/28   (2006.01)
  G06F 13/36   (2006.01)

(52) U.S. Cl. .................. 710/110; 710/311; 710/317; 710/306; 710/20; 711/119; 711/158; 370/389; 709/230

(58) Field of Classification Search ............. 710/110, 710/260–269
  See application file for complete search history.

(56) References Cited

U.S. PATENT DOCUMENTS

| | | | |
|---|---|---|---|
| 5,450,562 A * | 9/1995 | Rosenberg et al. ......... 711/119 |
| 6,732,242 B2 * | 5/2004 | Hill et al. ................ 711/158 |
| 6,871,246 B2 * | 3/2005 | Moyer ..................... 710/74 |
| 6,930,689 B1 * | 8/2005 | Giacalone et al. ......... 345/502 |
| 7,043,593 B1 * | 5/2006 | Tischler et al. ........... 710/311 |
| 7,051,150 B2 * | 5/2006 | Naumann et al. .......... 710/317 |
| 2002/0041592 A1 * | 4/2002 | Van Der Zee et al. ....... 370/389 |
| 2002/0062414 A1 * | 5/2002 | Hofmann et al. ........... 710/110 |
| 2003/0065800 A1 * | 4/2003 | Wyschogrod et al. ....... 709/230 |
| 2004/0221071 A1 * | 11/2004 | Baker et al. ............... 710/20 |
| 2005/0228930 A1 * | 10/2005 | Ning et al. ................ 710/306 |

* cited by examiner

Primary Examiner—Rehana Perveen
Assistant Examiner—Brian Misiura
(74) Attorney, Agent, or Firm—Nixon & Vanderhye P.C.

(57) ABSTRACT

A data processing apparatus comprises a master device 150, 160, 170, 180, a slave device 110, 120, 130 and a communication bus 140 via which transaction requests are passed from master to slave. A transaction annotator of the master device generates transaction identifiers having a master identifier portion and a priority request portion. The slave device determines an order of servicing of transaction requests in dependence upon transaction ordering requests at least partially derived from the master identifier portions and in dependence upon priority values specified in the priority request portions.

95 Claims, 5 Drawing Sheets

FIG 1

| MASTER ID | PRIORITY VALUE | PRIORITY TIMEOUT |
|---|---|---|
| 00 | 0 | 100 |
| 00 | 1 | 2 |
| 01 | 0 | 110 |
| 01 | 1 | 4 |
| 10 | 0 | 90 |
| 10 | 1 | 10 |
| 11 | 0 | 100 |
| 11 | 1 | 2 |

Figure 3A

| MASTER ID | PRIORITY VALUE | PRIORITY TIMEOUT |
|---|---|---|
| 0 | 00 | 100 |
| 0 | 01 | 50 |
| 0 | 10 | 20 |
| 0 | 11 | 2 |
| 1 | 00 | 40 |
| 1 | 01 | 20 |
| 1 | 10 | 10 |
| 1 | 11 | 5 |

ORDERING IN TRANSACTION REQUEST BUFFER

| TRANSACTION NUMBER | MASTER ID | PRIORITY | TRANSACTION TYPE |
|---|---|---|---|
| T1 | 110 | LOW | $W_1$ |
| T2 | 111 | LOW | $W_2$ |
| T3 | 111 | HIGH | $W_3$ |
| T4 | 111 | LOW | $R_4$ |
| T5 | 100 | HIGH | $R_5$ |

FIG 5A

ORDER OF SERVICING OF TRANSACTIONS

| TRANSACTION NUMBER | TRANSACTION TYPE | PRIORITY |
|---|---|---|
| T5 | R5 | HIGH |
| T4 | R4 | LOW |
| T2 | W2 | LOW |
| T3 | W3 | HIGH |
| T1 | W1 | LOW |

FIG 5B

TRANSACTION REQUEST SERVICING MECHANISM

BACKGROUND OF THE INVENTION

1. Field of the Invention

This invention relates to data processing systems. More particularly, this invention relates to a transaction request servicing mechanism for communication buses.

2. Description of the Prior Art

Efficient data communication between master devices and slave devices in data processing systems is a key factor in enhancing system performance. Data communication is typically mediated by communication buses and associated bus protocols. Examples of bus protocols are the Advanced Microprocessor Bus Architecture (AMBA™) family of protocols, which are suitable for system-on-chip bussing requirements, and was developed by ARM Limited of Cambridge, England.

It is known to send transaction requests, such as read requests and write requests, from a master device to a slave device via a bus with master identification (ID) information that identifies the source of the data. Known bus protocols provide that slave devices obey certain ordering constraints for the order of servicing of transaction requests from master devices. Such ordering constraints ensure that processing tasks are efficiently carried out without corrupting stored data or other problems which can arise with out of order servicing. Typically, some transaction requests will be more critical to system performance than others, for example an instruction fetch in the presence of an interrupt is a high priority transaction. Accordingly, in addition to master ID information and ordering constraints it is desirable to send transaction priority information along the bus. However, backwards compatibility of bus protocols is an important consideration in bus protocol development and so the addition of extra side-band signals to known bus protocols to accommodate priority information is problematic.

SUMMARY OF THE INVENTION

According to a first aspect the invention provides a data processing apparatus comprising:

a master device;

a slave device; and a communication bus operable to pass transaction requests from said master device to said slave device; wherein said master device having a transaction annotator operable to generate a transaction identifier as part of each transaction request passed from said master device to said slave device, said transaction identifier having a master identifier portion and a priority request portion specifying a priority value for said transaction request; and said slave device having transaction ordering logic operable to determine an order of service of a plurality of transaction requests having respective transaction identifiers in dependence upon transaction ordering constraints at least partially derived from master identifier portions of said transaction identifiers and in dependence upon said priority values of said transaction identifiers.

The present technique recognises that provision of a single transaction identifier signal comprising both transaction ordering constraint information and priority information allows priority information to be conveyed to the slave device yet obviates the need to provide a separate side-band signal on the bus and hence facilitates backwards compatibility with existing bus protocols. Use of the priority information together with the ordering constraints to determine an order of servicing of transaction requests allows transaction requests deemed to be of higher priority to be preferentially serviced yet avoids violation of important ordering constraints thereby enhancing system performance.

Although the master identifier portion of the transaction identifier could specify a master ID value such that there is a one-to-one mapping between master ID values and master devices, it is preferred that each master device has a plurality of possible master ID values associated with it. This has the advantage that, for example, transactions generated by different applications running on the same processor can be distinguished so that transaction sequences from each application can be independently ordered in cases where the processes themselves are independent of each other.

It will be appreciated that the ordering constraints used to determine the order of service of the transaction requests could relate to ordering of all transaction requests currently awaiting processing by the slave device or only to ordering of those transaction requests derived from the same master device. However, it is preferred that the ordering constraints relate only to ordering of subsets of transaction requests for which the master IDs specified by the master identifier portions of the transaction identifiers are identical. This provides greater flexibility for the slave to re-order the received transaction requests and to promote earlier servicing of high priority requests. Transaction requests associated with different master IDs are likely to relate to independent processing operations so a high priority transaction associated with one master ID can be serviced before a lower priority transaction of any different transaction ID without violating ordering constraints.

Although the transaction ordering constraints on which the order of servicing depends could be derived entirely from information specified in the master identifier portion of the transaction requests or by using information derived from any one of a number of possible sources, for example using comparisons of memory addresses specified by the transaction requests to determine if they relate to the same region of memory, it is preferred that the ordering constraints are partially derived from at least one of the request type (read request or write request) of the transaction and a comparison of memory address ranges specified by said transaction requests. The request type is easily determined from the transaction request data and use of the request type to derive ordering constraints allows known potential sources of data corruption to be avoided. For example it is known to avoid read-after-read violations and write-after-write violations in which read requests and write requests having the same master ID are not serviced in the order in which they are received by the slave device (or equivalently in the order in which they were issued by the process associated with the master ID.). Write-after-write ordering must be preserved to ensure that the most recently generated data values are stored in memory and not over-written by earlier-generated values. Read-after-read ordering must be preserved since the order in which the read requests are generated by a given process determines how the returned data is actually processed so if data reads are performed out of sequence for that process, the wrong data may be utilised in a given processing step. Comparison of the address ranges for transaction requests having the same master ID enables later reads to be serviced before earlier writes without erroneously reading the wrong data values.

It will be appreciated that the priority value could comprise any number of bits to specify different priority categories, for example, a 2-bit priority value would give four distinct priority levels or a 3-bit value would give eight distinct priority levels. However, it is preferred to use a single bit to specify a high/low priority for each transaction request. This has the advantage of leaving more free bits in the transaction identifier to convey other information.

Although the priority value could be used simply to re-order transaction requests received at a slave device to promote more rapid servicing of higher priority requests, it is advantageous to use the priority value to derive (e.g. from a look up table) a timeout value for servicing the transaction requests. For example two processor cycles could be specified for a high priority request whereas one hundred processor cycles could be specified as a timeout for a low priority request. Thus, the slave is provided not just with information on relative priorities of received requests but also with target servicing times for those requests. This is particularly advantageous where the priority information is derived from the concatenated master ID and priority value since different timeout values can be specified for each master ID.

It will be appreciated that the slave device could derive timeout values from only the priority request portion of the transaction identifier. However, it is advantageous to derive the timeout values from the concatenated value of the priority portion and at least part of the master identifier portion of the transaction identifier. Use of more of the transaction identifier in this way means that the priority value can be used to convey a priority category in very few bits yet, since at least part of the master ID value is included in derivation of the timeout value, the timeout value can be readily associated with the master ID that generated the transaction request.

In preferred embodiments logic such as a programmable register can be used to select a subset of the bits of the master identifier portions that are to be used to determine the timeout value.

Although the slave device could be provided with hardware configured to process the transaction identifier such that the first predetermined number m of bits correspond to the master identifier and the remaining bits correspond to the priority request portion, preferably the slave device is programmable to apply a mask to the transaction identifier to determine which portion corresponds to the master identifier portion. This promotes forward compatibility by offering the flexibility to accommodate a change in the format of the transaction identifier by simply re-programming the slave.

It will be appreciated that the slave device and the master device could be any one of a number of possible components of a data processing system. However, it is preferred that the slave device is a memory controller and the master device is one of: a central processing unit; a direct memory access controller; a liquid crystal display controller and a video controller.

According to a second aspect the invention provides a data processing method for passing transaction requests from a master device to a slave device across a communication bus, said method comprising the steps of:

generating in a master device a transaction identifier as part of each transaction request passed from said master device to said slave device, said transaction identifier having a master identifier portion and a priority request portion specifying a priority value for said transaction request; and determining at said slave device an order of service of a plurality of transaction requests having respective transaction identifiers in dependence upon transaction ordering constraints at least partially derived from master identifier portions of said transaction identifiers and in dependence upon said priority values of said transaction identifiers.

Complementary aspects of the invention as defined in the appended claims include a slave device, a master device, a bus carrying a transaction request signal according to the invention, a method of controlling a slave device to service transaction requests, a method of generating transaction requests in a master device and a method of transmitting a transaction request on a bus.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
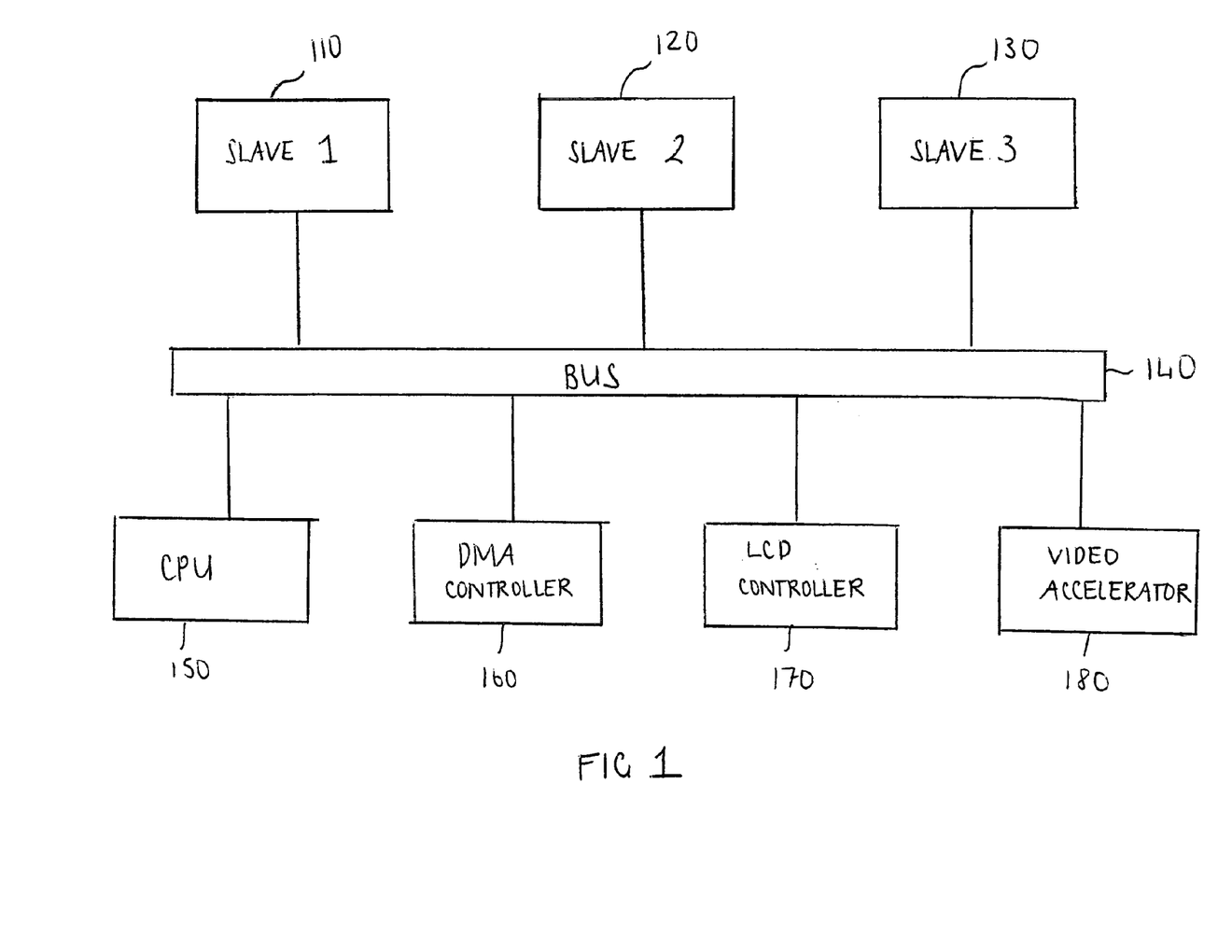
FIG. 1 schematically illustrates a data processing system including master and slave devices communicating via a common bus.

FIG. 1 schematically illustrates a data processing system. The system comprises three slave devices 110, 120, 130 and four master devices 150, 160, 170, 180. The master devices are a central processing unit 150, a direct memory access (DMA) controller 160, a liquid crystal display (LCD) controller 170 and a video accelerator 180. The slave devices are memory controllers having attached memory. A communication bus 140 provides a data communication path between master and slave devices. The bus 140 uses the AMBA™ AXI protocol as developed by ARM Limited, Cambridge, England to mediate interconnection and management of the master and slave devices of the system. The AXI version of AMBA™ is a burst-based protocol suitable for high-performance, high-frequency system designs. Key features of the AMBA™ AXI protocol include separate address/control and data phases and support for out-of-order transaction completion.

The master devices 150, 160, 170, 180 generate transaction requests including read requests and write requests. Every transaction has associated address information and control information that describes the nature of data to be transferred. The data is transferred between master device and slave device using a write channel to the slave or a read channel to the master. The read channel conveys both read data and any read response information from the slave back to the master whereas the write channel conveys write data from the master to the slave. The bus protocol supports multiple outstanding transactions and each slave device 110, 120, 130 maintains a queue of incoming transactions for servicing in a buffer. The order of receipt of transaction requests associated with a given master ID in the slave transaction queue corresponds to the order of generation of those transaction requests by the associated master process.

Note that the division between master devices and slave devices is not a strict one since a given processing device could serve as a master on one interface but as a slave on a different interface.

The AXI protocol gives a transaction ID tag to every transaction that is sent across the bus 140. The known protocol requires that transactions with the same master ID tag are completed in order but transactions having different master ID tags can be completed out of order. However, as shall be explained below, according to the present technique priority information is also taken into account in determining the order of servicing. There are two main advantages in terms of improved system performance from completing transactions out-of-order. Firstly, servicing of transactions with fast-responding slaves can be completed in advance of earlier transactions with slaves that have slow response times. Secondly, it allows for complex slaves to return read data out of order, for example, if a data item for a later read request is available from an internal buffer before data for an earlier read request is available.

If a master device 150, 160, 170, 180 requires that all transactions be completed in the order that they were issued, then those transactions must have the same master ID tag. However, if the master does not require in-order transaction completion then it may generate the transaction requests with different master ID tags allowing them to be completed in any order. Accordingly, more than one master ID can be associated with a given master device. For example, the DMA controller 160 will communicate data and hence generate transactions associated with different processes. Since there is no need for ordering of transactions generated in relation to different processes, the DMA controller will use different master IDs for sequences of transactions associated with different processes.

Figure 2A:
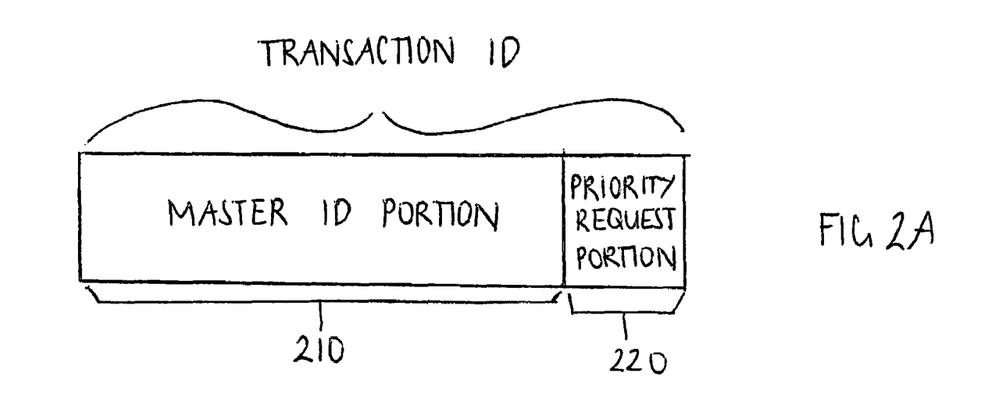
FIG. 2A schematically illustrates a format for a transaction identifier.

FIG. 2A schematically illustrates a format for a transaction identifier according to the present technique. The transaction identifier comprises a master ID portion 210 and a priority request portion 220. In known bus protocols, such as the AMBA™ AXI protocol, all bit fields of the transaction identifier are used for the master ID from which sequence ordering constraints are derived. However, according to the present technique some bits of the transaction ID are used as an indication of the access priority for the associated transaction request. The slave devices are programmable to determine the number of bits dedicated to the priority request portion and to the master ID portion by applying a mask. Accordingly, the slaves can be re-programmed to change the number of bits dedicated to each portion. The slave uses the concatenated value of the master ID portion and the priority request portion to derive transaction request priorities and applies the mask to extract the master ID portion.

Figure 2B:
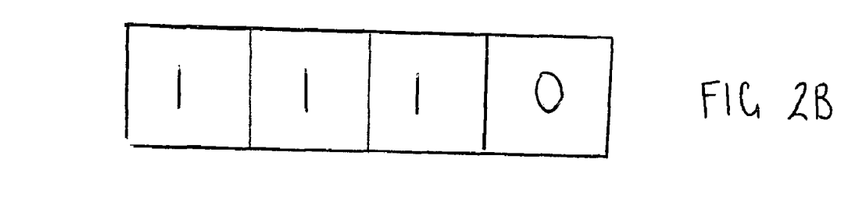
FIGS. 2B and 2C are examples of transaction identifiers that share a common master identifier but having different priority values.
Figure 2C:
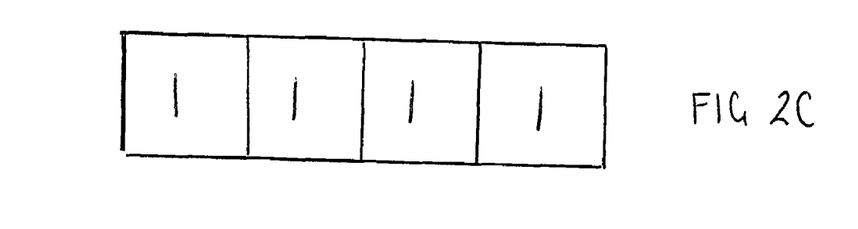

FIGS. 2B and 2C are examples of transaction identifiers that share a common master identifier but have different priority values. In FIGS. 2B and 2C the first three bits of the four-bit transaction ID correspond to the master ID whilst the last bit gives a HIGH/LOW priority indication.

The transaction IDs of FIGS. 2B and 2C both have the same master ID of 111, but FIG. 2B has priority value 0 indicating that it is a low priority transaction request whereas FIG. 2C has priority value 1 indicating that it is a high priority transaction request. A look-up table is used to derive timeout values for each of these transaction requests. The look-up table, in this example, maps decimal value 14 (corresponding to the binary transaction ID of FIG. 2B) to a timeout value of 100 processor cycles and maps decimal value 15 (corresponding to the binary transaction ID of FIG. 2C) to a timeout value of 2 processor cycles. Accordingly, the higher priority transaction request has a shorter timeout value, the value of the timeout depending on the transaction ID. If the transaction cannot be serviced within the requested timeout then it will still be serviced at a later stage although in alternative arrangements an abort could be generated if the timeout value is not complied with.

In determining an order of servicing of transactions having the same master ID account must also be taken of predetermined ordering constraints. In particular, for transaction requests generated by the same master ID the read requests must be serviced in the order in which they were generated and similarly the write requests must be serviced in the order in which they were generated although an later generated read request may be serviced before an earlier generated write request having the same master ID. Accordingly, if the transaction IDs of FIGS. 2B and 2C are both read requests or if they are both requests then the high priority request (FIG. 2C) cannot be serviced before the low priority request (FIG. 2B). However, in this case both requests could be promoted in the order of servicing above later generated transactions having different master IDs.

Figure 3A:
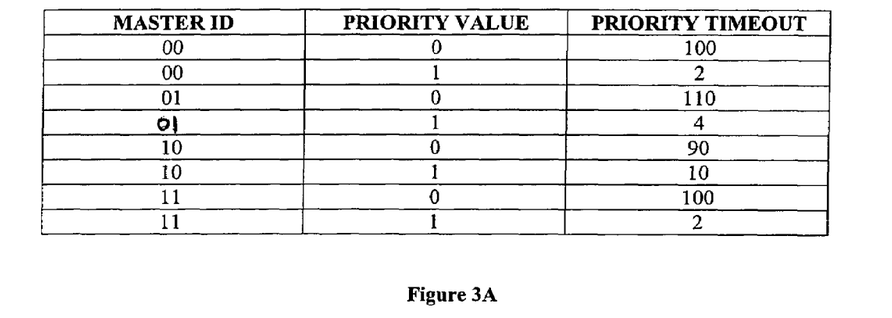
FIG. 3A schematically illustrates a mapping between transaction identifiers and priority timeout values when a single bit of a three bit transaction ID is used to specify a priority value.

FIG. 3A schematically illustrates a mapping between transaction identifiers and priority timeout values when a single bit of a three bit transaction ID is used to specify a priority value. The three-bit transaction identifier allows for eight different master ID/priority value combinations. Since the priority value is 1-bit the table of FIG. 3A divides into four groups of two entries, i.e. a low priority value 0 and a high priority value 1 for each of four master devices 00, 01, 10 and 11. However, since the priority information is derived from the full transaction ID, and not just the priority request portion, a different pair of high/low priority timeout values can be applied to each master ID if required. For example master ID 00 has a low priority timeout of one hundred processor cycles and a high priority timeout value of two processor cycles whereas master ID 10 has a low priority timeout of ninety processor cycles and a high priority timeout value of ten processor cycles.

Figure 3B:
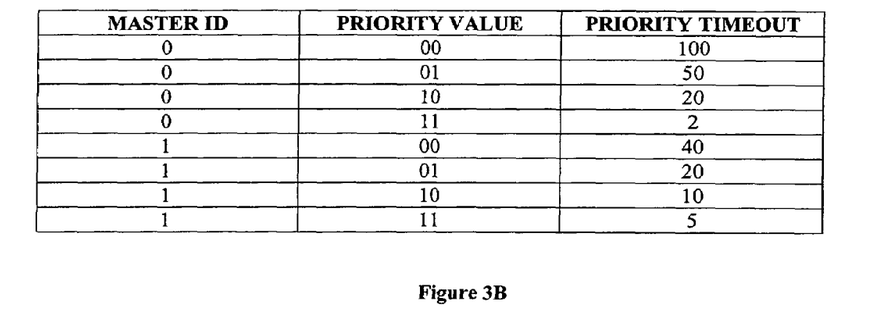
FIG. 3B schematically illustrates a mapping between transaction identifiers and priority timeout values when two bits of a three bit transaction ID are used to specify a priority value.

FIG. 3B schematically illustrates a mapping between transaction identifiers and priority timeout values when two bits of a three bit transaction ID are used to specify a priority value. Again, there are eight different master ID/priority value combinations but this time there are four different priority levels 00, 01, 10 and 11 with corresponding timeout values specified for each master ID but only two different master IDs can be specified using this format. In alternative arrangements only a subset of bits of the master ID portion is used together with the priority portion of the transaction ID to derive the timeout value and hence the order of service of the transaction requests. In this case a programmable register value is used to select the required subset of master ID bits.

Figure 4:
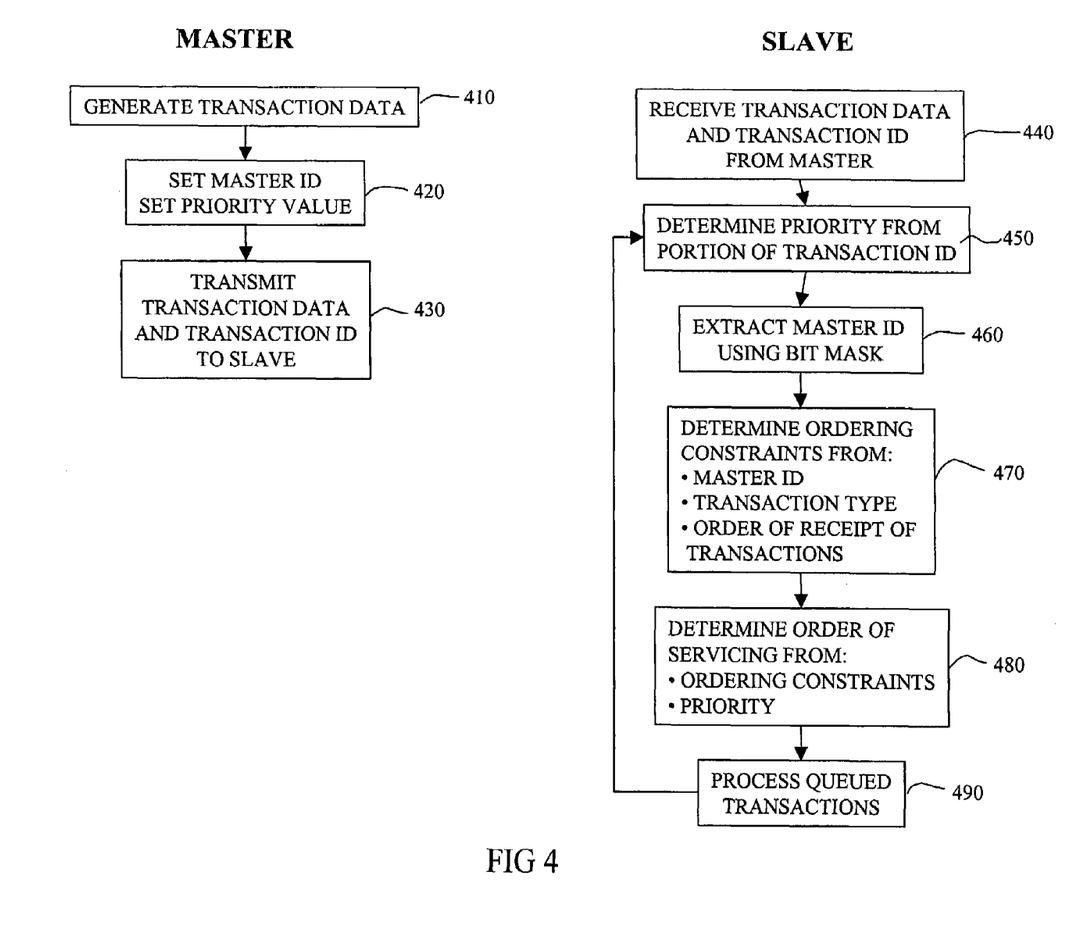
FIG. 4 schematically illustrates a transaction request servicing sequence from generation of a transaction request in a master device to servicing of the transaction request in a slave device.

FIG. 4 schematically illustrates a transaction request servicing sequence starting from generation of a transaction request in a master device and ending with servicing of the transaction request in a slave device. At stage 410, the transaction data comprising a read or a write request and specifying a target memory address range is generated in the master device. At stage 420, a master ID value and a priority value are set by the master device. The master ID value allocated defines the transaction request sequence with respect to which, in this example, read-after-read ordering and write-after-write ordering must be obeyed. At stage 430, the master ID tag and the priority value are concatenated and transmitted as a single signal across the bus to the appropriate slave device.

Next, at stage 440, the slave receives the transaction request comprising the transaction data and the transaction ID from the master device. The transaction request is placed in a buffered queue of transactions awaiting servicing, the order of receipt of the transaction indicating the order of generation of the transaction by the master device relative to the other queued transactions. At stage 450, the slave device uses the complete transaction ID to derive priority information for the transaction. In particular, a priority timeout value is obtained from the complete transaction ID from a look-up table, the priority timeout value depending on both the master ID and the priority category of the transaction as specified by the priority portion.

Next, at stage 460, the slave device extracts the master ID value from the transaction ID based on a pre-programmed bit mask. The master ID value is needed to correctly implement the required ordering constraints for the transaction, the order of servicing with respect to other transactions having the same master ID being important. At stage 470, the slave determines the ordering constraints from the extracted master ID, from information giving the type of transaction i.e. read request or write request and from the order of receipt of the transactions by the slave.

Ordering of read requests having the same master ID and ordering of write requests having the same master ID must be unaltered. Read requests for a given master ID may be serviced before write requests having the same master ID only if the read request and write request relate to different memory areas. This can be determined from the address specified in the transaction data. If the read request relates to the same memory area as the write request, then re-ordering the transactions such that the read is serviced before the write request would result in the wrong (non-updated) data value being read. In general, it is not efficient in terms of system performance to service write requests before read requests having the same master ID. Once the ordering constraints have been established, the next stage 480 involves determining an order of servicing of the currently queued transactions from both the ordering constraints and the priority information. The order of servicing is determined so as to service higher priority transactions before lower priority transactions but the ordering constraints must still be adhered to. Thus, for example, a later-arriving higher priority read request cannot be serviced before an earlier lower priority read request having the same master ID since this would violate the ordering constraints. However both read requests could be serviced before a lower priority read request associated with a different master ID. Finally, at stage 490 the queued transactions are processed according to the order of servicing until further transaction requests are received by the slave whereupon the order of servicing will be re-assessed and the process will return to stage 450.

Figure 5A:
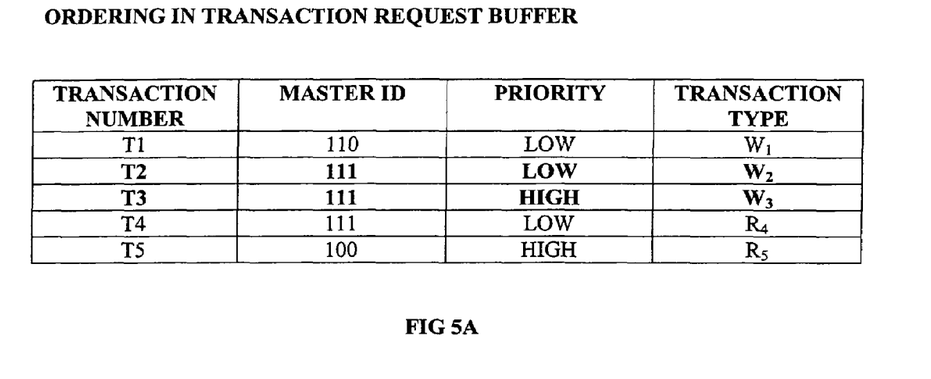
FIGS. 5A and 5B schematically illustrate how a sequence of transaction requests that are queued in a buffer of a slave device are re-ordered taking account of the ordering constraints and priority information contained in the associated transaction identifiers.
Figure 5B:
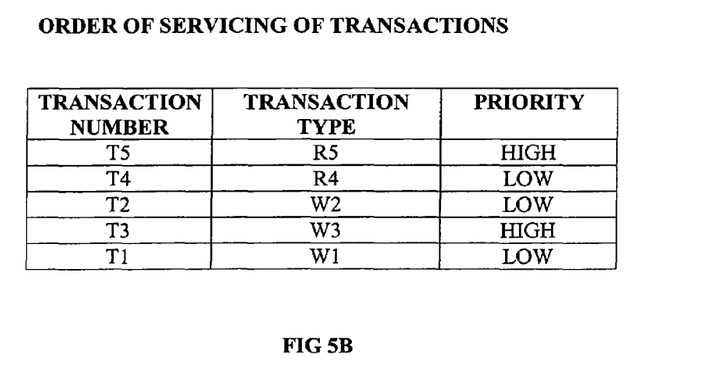

FIGS. 5A and 5B schematically illustrate how a sequence of transaction requests that are queued in a buffer of a slave device are re-ordered taking account of the ordering constraints and priority information contained in the associated transaction identifiers. FIG. 5A illustrates a sequence of five transaction requests that are queued in a transaction request buffer of the slave device. The first transaction request T1 is a write request of low priority that was generated by master device and assigned a master ID 110. The second, third and fourth transaction requests T2, T3, T4 are all associated with master ID 111 and since they have the same master ID ordering constraints are important for this subset of three transaction requests. T2 is a low priority write request, T3 is a high priority write request and T4 is a low priority read request. Since T2 and T3 are both read requests having the same master ID the order in which these requests are serviced must be strictly the order in which they were received despite the fact that later request T3 is of higher priority than T2. However, the read request T4 can be serviced before the write request ordered sequence T2, T3 provided that the read request specifies a different memory address range from either the write request T2 or the write request T3. The fifth transaction request T5 is a high priority read request having master ID 100.

FIG. 5B is a table showing the order of servicing of the transactions listed in the table of FIG. 5A. The re-ordering of the transaction request queue is implemented in hardware using a linked list. It is clear that the two read transactions T5 and T4 have been promoted to the top of the queue in the order of servicing. This is because preferentially servicing read requests is known to enhance system performance since read requests being more system-critical than write requests. T4 and T5 have different master ID s so that high priority T5 read request has been promoted above low priority T4 read request without violating any ordering constraints. Of the three write requests T1, T2 and T3 of FIG. 5A only T3 is high priority. However T2 and T3 have the same master ID so T3 cannot be serviced before T2. However, T3 can be serviced earlier than it otherwise would by promoting both T2 and T3 to be serviced earlier than T1, which has a different master ID. Thus the high priority nature of T3 has been accommodated without violating the ordering constraints.

In the case of re-ordering transaction requests having the same master ID to take account of priority information, in particular, if wishing to perform a read before write re-ordering, the address ranges specified in the transaction requests must be cross-checked to ensure that they do not overlap, thereby avoiding the potential read-after-write hazard. Although, the converse a write before read re-ordering for transactions having the same master ID could be performed subject to the address overlap checking, such re-ordering tends not to result in enhanced system performance. Where transaction requests have different master IDs, re-ordering can safely be performed without checking the specified address ranges.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A data processing apparatus comprising:
 a master device;
 a first slave device; and
 a common communication bus providing a plurality of communication paths between said master device, said first slave device and at least one further slave device, and for passing transaction requests from said master device to said first slave device; wherein
 said master device having a transaction annotator for generating a transaction identifier as part of each transaction request passed from said master device to said first slave device, said transaction identifier having a master identifier portion and a priority request portion specifying a priority value for said transaction request; and
 said first slave device having transaction ordering logic operable to determine an order of service of a plurality of transaction requests having respective transaction identifiers in dependence upon transaction ordering constraints at least partially derived from master identifier portions of said transaction identifiers and in dependence upon said priority values of said transaction identifiers, wherein said master identifier portion specifies one of a plurality of possible master identifier values associated with said master device, wherein said transaction ordering constraints relate only to subsets of transaction request generated by said master device for which said master identifier portion specifies an identical master identifier value.

2. A data processing apparatus according to claim 1, in which said transaction ordering constraints are partially derived from at least one of a request type of a transaction associated with said transaction identifier and a comparison of memory address ranges specified by said transaction requests.

3. A data processing apparatus according to claim 1, in which said priority value is used to derive a timeout value for servicing of a transaction request associated with said transaction identifier.

4. A data processing apparatus according to claim 3, in which said timeout value is derived from concatenated values of at least part of said master identifier portion and said priority portion of said transaction identifier.

5. A data processing apparatus according to claim 4, in which said first slave device comprises logic operable to select a subset of bits of said master identifier portion to be concatenated with said priority portion of said transaction identifier to derive said timeout value.

6. A data processing apparatus according to claim 1, in which said priority request portion comprises at least one bit value specifying either a high priority or a low priority for a transaction request associated with said transaction identifier.

7. A data processing apparatus according to claim 1, in which said transaction request is either a read request for reading data from a memory attached to said first slave device or a write request for writing data to said memory attached to said first slave device.

8. A data processing apparatus according to claim 1, in which said transaction identifier comprises a sequence of bit values and said first slave device is programmable to apply a mask to said transaction identifier determining which of said sequence bit values correspond to said priority portion and which of said sequence of bit values correspond to said master identifier portion.

9. A data processing apparatus according to claim 1, in which said first slave device is a memory controller.

10. A data processing apparatus according to claim 1, in which said master device is one of:
   a central processing unit;
   a direct memory access controller;
   a liquid crystal display controller; or
   a video accelerator.

11. A master device operable to pass transaction requests across a common communication bus to a first slave device, said master device for providing a plurality of communication paths between said master device, said first slave device and at least one further slave device, said master device comprising a transaction annotator for generating a transaction identifier as part of each transaction request passed from said master device to said first slave device, said transaction identifier having a master identifier portion and a priority request portion specifying a priority value for said transaction request;
   wherein said transaction identifier contains information enabling said first slave device to determine an order of service of a plurality of transaction requests having respective transaction identifiers in dependence upon transaction ordering constraints at least partially derived from said master identifier portions of said transaction identifiers and in dependence upon said priority values of said transaction identifiers, wherein said master identifier portion specifies one of a plurality of possible master identifier values associated with said master device, wherein said transaction ordering constraints relate only to subsets of transaction requests generated by said master device for which said master identifier portion specifies an identical master identifier value.

12. A master device according to claim 11, in which said transaction ordering constraints are partially derived from at least one of a request type of a transaction associated with said transaction identifier and a comparison of memory address ranges specified by said transaction requests.

13. A master device according to claim 11, in which said priority value is used to derive a timeout value for servicing of a transaction request associated with said transaction identifier.

14. A master device according to claim 13, in which said timeout value is derived from concatenated values of at least part of said master identifier portion and said priority portion of said transaction identifier.

15. A master device according to claim 14, in which said first slave device comprises logic operable to select a subset of bits of said master identifier portion to be concatenated with said priority portion to derive said timeout value.

16. A master device according to claim 11, in which said priority request portion comprises at least one bit value specifying either a high priority or a low priority for a transaction request associated with said transaction identifier.

17. A master device according to claim 11, in which said transaction request is either a read request for reading data from a memory attached to said first slave device or a write request for writing data to said memory attached to said first slave device.

18. A master device according to claim 11, in which said transaction identifier comprises a sequence of bit values and said first slave device is programmable to apply a mask to said transaction identifier determining which of said sequence bit values correspond to said priority portion and which of said sequence of bit values correspond to said master identifier portion.

19. A master device according to claim 11, in which said first slave device is a memory controller.

20. A master device according to claim 11, in which said master device is one of:
   a central processing unit;
   a direct memory access controller;
   a liquid crystal display controller; or
   a video accelerator.

21. A first slave device operable to receive transaction requests from a master device across a common communication bus providing a plurality of communication paths between said master device, said first slave device and at least one further slave device, said first slave device having transaction ordering logic operable process a transaction identifier received from a master device as part of a transaction request, said transaction request having a master identifier portion and a priority request portion specifying a priority value for said transaction request, said transaction ordering logic being operable to determine an order of service of a plurality of transaction requests having respective transaction identifiers in dependence upon transaction ordering constraints at least partially derived from said master identifier portions of said transaction identifiers and in dependence upon said priority values of said transaction identifiers, wherein said master identifier portion specifies one of a plurality of possible master identifier values associated with said master device, wherein said transaction ordering constraints relate only to subsets of transaction requests generated by said master device for which said master identifier portion specifies an identical master identifier value.

22. A first slave device according to claim 21, in which said transaction ordering constraints are partially derived from at least one of a request type of a transaction associated with said transaction identifier and a comparison of memory address ranges specified by said transaction requests.

23. A first slave device according to claim 21, in which said priority value is used to derive a timeout value for servicing of a transaction request associated with said transaction identifier.

24. A first slave device according to claim 21, in which said timeout value is derived from concatenated values of at least part of said master identifier portions and said priority portions of said transaction identifiers.

25. A first slave device according to claim 24, comprising logic operable to select a subset of bits of said master identifier portion to be concatenated with said priority portion of said transaction identifier to derive said timeout value.

26. A first slave device according to claim 21, in which said priority request portion comprises at least one bit value specifying either a high priority or a low priority for a transaction request associated with said transaction identifier.

27. A first slave device according to claim 21, in which said transaction request is either a read request for reading data from a memory attached to said first slave device or a write request for writing data to said memory attached to said first slave device.

28. A first slave device according to claim 21, in which said transaction identifier comprises a sequence of bit values and said first slave device is programmable to apply a mask to said transaction identifier determining which of said sequence bit values correspond to said priority portion and which of said sequence of bit values correspond to said master identifier portion.

29. A first slave device according to claim 21, in which said first slave device is a memory controller.

30. A first slave device according to claim 21, in which said master device is one of:
    a central processing unit;
    a direct memory access controller;
    a liquid crystal display controller; or
    a video accelerator.

31. A common bus carrying a transaction request signal from a master device to a first slave device, said common bus providing a plurality of communication paths between said master device, said first slave device and at least one further slave device, and for passing said transaction request signal comprising a transaction identifier having a master identifier portion and a priority request portion specifying a priority value for said transaction request, said transaction identifier enabling said first slave device to determine an order of service of a plurality of transaction requests having respective transaction identifiers in dependence upon transaction ordering constraints at least partially derived from master identifier portions of said transaction identifiers and in dependence upon said priority values of said transaction identifiers, wherein said master identifier portion specifies one of a plurality of possible master identifier values associated with said master device, wherein said transaction ordering constraints relate only to subsets of transaction requests generated by said master device for which said master identifier portion specifies an identical master identifier value.

32. A bus according to claim 31, in which said transaction ordering constraints are partially derived from at least one of a request type of a transaction associated with said transaction identifier and a comparison of memory address ranges specified by said transaction requests.

33. A bus according to claim 31, in which said priority value is used to derive a timeout value for servicing of a transaction request associated with said transaction identifier.

34. A bus according to claim 33, in which said timeout value is derived from concatenated values of at least part of said master identifier portion and said priority portion of said transaction identifier.

35. A bus according to claim 34, in which said timeout value is derived by said first slave device using logic to select a subset of bits of said master identifier portion to be concatenated with said priority portion to derive said timeout value.

36. A bus according to claim 31, in which said priority request portion comprises at least one bit value specifying either a high priority or a low priority for a transaction request associated with said transaction identifier.

37. A bus according to claim 31, in which said transaction request is either a read request for reading data from a memory attached to said first slave device or a write request for writing data to said memory attached to said first slave device.

38. A bus according to claim 31, in which said transaction identifier comprises a sequence of bit values and said first slave device is programmable to apply a mask to said transaction identifier determining which of said sequence bit values correspond to said priority portion and which of said sequence of bit values correspond to said master identifier portion.

39. A bus according to claim 31, in which said first slave device is a memory controller.

40. A bus according to claim 31, in which said master device is one of:
    a central processing unit;
    a direct memory access controller;
    a liquid crystal display controller; or
    a video accelerator.

41. A data processing method for passing transaction requests from a master device to a slave device across a common communication bus providing a plurality of communication paths between said master device, said first slave device and at least one further slave device, said method comprising the steps of:
    generating in a master device a transaction identifier as part of each transaction request passed from said master device to said first slave device, said transaction identifier having a master identifier portion and a priority request portion specifying a priority value for said transaction request; and
    determining at said first slave device an order of service of a plurality of transaction requests having respective transaction identifiers in dependence upon transaction ordering constraints at least partially derived from master identifier portions of said transaction identifiers and in dependence upon said priority values of said transaction identifiers, wherein said master identifier portion specifies one of a plurality of possible master identifier values associated with said master device, wherein said transaction ordering constraints relate only to subsets of transaction requests generated by said master device for which said master identifier portion specifies an identical master identifier value.

42. A data processing method according to claim 41, in which said transaction ordering constraints are partially derived from at least one of a request type of a transaction associated with said transaction identifier and a comparison of memory address ranges specified by said transaction requests.

43. A data processing method according to claim 41, in which said priority value is used to derive a timeout value for servicing of a transaction request associated with said transaction identifier.

44. A data processing method according to claim 43, in which said timeout value is derived from concatenated values of at least part of said master identifier portions and said priority portions of said transaction identifiers.

45. A data processing method according to claim 44, in which said first slave device comprises logic operable to select a subset of bits of said master identifier portion to be concatenated with said priority portion of said transaction identifier to derive said timeout value.

46. A data processing method according to claim 41, in which said priority request portion comprises at least one bit value specifying either a high priority or a low priority for a transaction request associated with said transaction identifier.

47. A data processing method according to claim 41, in which said transaction request is either a read request for reading data from a memory attached to said first slave device or a write request for writing data to said memory attached to said first slave device.

48. A data processing method according to claim 41, in which said transaction identifier comprises a sequence of bit values and said first slave device is programmable to apply a mask to said transaction identifier determining which of said sequence bit values correspond to said priority portion and which of said sequence of bit values correspond to said master identifier portion.

49. A data processing method according to claim 41, in which said first slave device is a memory controller.

50. A data processing method according to claim 41, in which said master device is one of:
    a central processing unit;
    a direct memory access controller;
    a liquid crystal display controller; or
    a video accelerator.

51. A method of generating in a master device, transaction requests for sending across a common communication bus to a first slave device, said common communications bus providing a plurality of communication paths between said master device, said first slave device and at least one further slave device, said method comprising the step of:
    generating a transaction identifier as part of each transaction request passed from said master device to said first slave device, said transaction identifier having a master identifier portion and a priority request portion specifying a priority value for said transaction request;
    wherein said transaction identifier contains information enabling said first slave device to determine an order of service of a plurality of transaction requests having respective transaction identifiers in dependence upon transaction ordering constraints at least partially derived from said master identifier portions of said transaction identifiers and in dependence upon said priority values of said transaction identifiers, wherein said master identifier portion specifies one of a plurality of possible master identifier values associated with said master device, wherein said transaction ordering constraints relate only to subsets of transaction request generated by said master device for which said master identifier portion specifies an identical master identifier value.

52. A method according to claim 51, in which said transaction ordering constraints are partially derived from at least one of a request type of a transaction associated with said transaction identifier and a comparison of memory address ranges specified by said transaction requests.

53. A method according to claim 51, in which said priority value is used to derive a timeout value for servicing of a transaction request associated with said transaction identifier.

54. A method according to claim 53, in which said timeout value is derived from concatenated values of at least part of said master identifier portion and said priority portion of said transaction identifier.

55. A method according to claim 51, in which said priority request portion comprises at least one bit value specifying either a high priority or a low priority for a transaction request associated with said transaction identifier.

56. A method according to claim 51, in which said transaction request is either a read request for reading data from a memory attached to said first slave device or a write request for writing data to said memory attached to said first slave device.

57. A method according to claim 51, in which said transaction identifier comprises a sequence of bit values and said first slave device is programmable to apply a mask to said transaction identifier determining which of said sequence bit values correspond to said priority portion and which of said sequence of bit values correspond to said master identifier portion.

58. A method according to claim 51, in which said first slave device is a memory controller.

59. A method according to claim 51, in which said master device is one of:
    a central processing unit;
    a direct memory access controller;
    a liquid crystal display controller; or
    a video accelerator.

60. A method of controlling a slave device to service transaction requests received from a master device across a common communication bus providing a plurality of communication paths between said master device, said first slave device and at least one further slave device, said method comprising the step of:
    processing a transaction identifier received from a master device as part of a transaction request, said transaction request having a master identifier portion and a priority request portion specifying a priority value for said transaction request, said transaction ordering logic being operable to determine an order of service of a plurality of transaction requests having respective transaction identifiers in dependence upon transaction ordering constraints at least partially derived from said master identifier portions of said transaction identifiers and in dependence upon said priority values of said transaction identifiers, wherein said master identifier portion specifies one of a plurality of possible master identifier values associated with said master device, wherein said transaction ordering constraints relate only to subsets of transaction requests generated by said master device for which said master identifier portion specifies an identical master identifier value.

61. A method according to claim 60, in which said transaction ordering constraints are partially derived from at least one of a request type of a transaction associated with said transaction identifier and a comparison of memory address ranges specified by said transaction requests.

62. A method according to claim 60, in which said priority value is used to derive a timeout value for servicing of a transaction request associated with said transaction identifier.

63. A method according to claim 62, in which said timeout value is derived from concatenated values of at least part of said master identifier portions and said priority portions of said transaction identifiers.

64. A method according to claim 63, in which said first slave device comprises logic operable to select a subset of bits of said master identifier portion to be concatenated with said priority portion of said transaction identifier to derive said timeout value.

65. A method according to claim 60, in which said priority request portion comprises at least one bit value specifying either a high priority or a low priority for a transaction request associated with said transaction identifier.

66. A method according to claim 60, in which said transaction request is either a read request for reading data from a memory attached to said first slave device or a write request for writing data to said memory attached to said first slave device.

67. A method according to claim 60, in which said transaction identifier comprises a sequence of bit values and said first slave device is programmable to apply a mask to said transaction identifier determining which of said sequence bit values correspond to said priority portion and which of said sequence of bit values correspond to said master identifier portion.

68. A method according to claim 60, in which said first slave device is a memory controller.

69. A method according to claim 60, in which said master device is one of:
 a central processing unit;
 a direct memory access controller;
 a liquid crystal display controller; or
 a video accelerator.

70. A method of transmitting a transaction request on a common communications bus providing a plurality of communication paths between a master device, a first slave device and at least one further slave device comprising the steps of:
 generating a transaction request signal comprising a transaction identifier having a master identifier portion and a priority request portion specifying a priority value for said transaction request, said transaction identifier enabling said first slave device to determine an order of service of a plurality of transaction requests having respective transaction identifiers in dependence upon transaction ordering constraints at least partially derived from master identifier portions of said transaction identifiers and in dependence upon said priority values of said transaction identifiers; and
 transmitting said transaction request signal across said common communication bus, wherein said master identifier portion specifies one of a plurality of possible master identifier values associated with said master device, wherein said transaction ordering constraints relate only to subsets of transaction request generated by said master device for which said master identifier portion specifies an identical master identifier value.

71. A method according to claim 70, in which said transaction ordering constraints are partially derived from at least one of a request type of a transaction associated with said transaction identifier and a comparison of memory address ranges specified by said transaction requests.

72. A method according to claim 70, in which said priority value is used to derive a timeout value for servicing of a transaction request associated with said transaction identifier.

73. A method according to claim 70, in which said timeout value is derived from concatenated values of at least part of said master identifier portions and said priority portions of said transaction identifiers.

74. A method according to claim 73, in which said first slave device comprises logic operable to select a subset of bits of said master identifier portion to be concatenated with said priority portion of said transaction identifier to derive said timeout value.

75. A method according to claim 70, in which said priority request portion comprises at least one bit value specifying either a high priority or a low priority for a transaction request associated with said transaction identifier.

76. A method according to claim 70, in which said transaction request is either a read request for reading data from a memory attached to said first slave device or a write request for writing data to said memory attached to said first slave device.

77. A method according to claim 70, in which said transaction identifier comprises a sequence of bit values and said first slave device is programmable to apply a mask to said transaction identifier determining which of said sequence bit values correspond to said priority portion and which of said sequence of bit values correspond to said master identifier portion.

78. A method according to claim 70, in which said first slave device is a memory controller.

79. A method according to claim 70, in which said master device is one of:
 a central processing unit;
 a direct memory access controller;
 a liquid crystal display controller; or
 a video accelerator.

80. A data processing apparatus comprising:
 a master device;
 a first slave device; and
 a common communication bus providing a plurality of communication paths between said master device, said first slave device and at least one further slave device, and for passing transaction requests from said master device to said first slave device; wherein
 said master device having a transaction annotator for generating a transaction identifier as part of each transaction request passed from said master device to said first slave device, said transaction identifier having a master identifier portion and a priority request portion specifying a priority value for said transaction request; and
 said first slave device having transaction ordering logic operable to determine an order of service of a plurality of transaction requests having respective transaction identifiers in dependence upon transaction ordering constraints at least partially derived from master identifier portions of said transaction identifiers and in dependence upon said priority values of said transaction identifiers, wherein said transaction ordering constraints are partially derived from at least one of a request type of a transaction associated with said transaction identifier and a comparison of memory address ranges specified by said transaction requests.

81. A data processing apparatus comprising:
a master device;
a first slave device; and
a common communication bus providing a plurality of communication paths between said master device, said first slave device and at least one further slave device, and for passing transaction requests from said master device to said first slave device; wherein
said master device having a transaction annotator for generating a transaction identifier as part of each transaction request passed from said master device to said first slave device, said transaction identifier having a master identifier portion and a priority request portion specifying a priority value for said transaction request; and
said first slave device having transaction ordering logic operable to determine an order of service of a plurality of transaction requests having respective transaction identifiers in dependence upon transaction ordering constraints at least partially derived from master identifier portions of said transaction identifiers and in dependence upon said priority values of said transaction identifiers, wherein said priority value is used to derive a timeout value for servicing of a transaction request associated with said transaction identifier, wherein said timeout value is derived from concatenated values of at least part of said master identifier portion and said priority portion of said transaction identifier.

82. A master device operable to pass transaction requests across a common communication bus to a first slave device, said master device for providing a plurality of communication paths between said master device, said first slave device and at least one further slave device, said master device comprising a transaction annotator for generating a transaction identifier as part of each transaction request passed from said master device to said first slave device, said transaction identifier having a master identifier portion and a priority request portion specifying a priority value for said transaction request;
wherein said transaction identifier contains information enabling said first slave device to determine an order of service of a plurality of transaction requests having respective transaction identifiers in dependence upon transaction ordering constraints at least partially derived from said master identifier portions of said transaction identifiers and in dependence upon said priority values of said transaction identifiers, wherein said transaction ordering constraints are partially derived from at least one of a request type of a transaction associated with said transaction identifier and a comparison of memory address ranges specified by said transaction requests.

83. A master device operable to pass transaction requests across a common communication bus to a first slave device, said master device for providing a plurality of communication paths between said master device, said first slave device and at least one further slave device, said master device comprising a transaction annotator for generating a transaction identifier as part of each transaction request passed from said master device to said first slave device, said transaction identifier having a master identifier portion and a priority request portion specifying a priority value for said transaction request;
wherein said transaction identifier contains information enabling said first slave device to determine an order of service of a plurality of transaction requests having respective transaction identifiers in dependence upon transaction ordering constraints at least partially derived from said master identifier portions of said transaction identifiers and in dependence upon said priority values of said transaction identifiers, wherein said priority value is used to derive a timeout value for servicing of a transaction request associated with said transaction identifier, wherein said timeout value is derived from concatenated values of at least part of said master identifier portion and said priority portion of said transaction identifier.

84. A first slave device operable to receive transaction requests from a master device across a common communication bus providing a plurality of communication paths between said master device, said first slave device and at least one further slave device, said first slave device having transaction ordering logic operable process a transaction identifier received from a master device as part of a transaction request, said transaction request having a master identifier portion and a priority request portion specifying a priority value for said transaction request, said transaction ordering logic being operable to determine an order of service of a plurality of transaction requests having respective transaction identifiers in dependence upon transaction ordering constraints at least partially derived from said master identifier portions of said transaction identifiers and in dependence upon said priority values of said transaction identifiers, said transaction ordering constraints are partially derived from at least one of a request type of a transaction associated with said transaction identifier and a comparison of memory address ranges specified by said transaction requests.

85. A first slave device operable to receive transaction requests from a master device across a common communication bus providing a plurality of communication paths between said master device, said first slave device and at least one further slave device, said first slave device having transaction ordering logic operable process a transaction identifier received from a master device as part of a transaction request, said transaction request having a master identifier portion and a priority request portion specifying a priority value for said transaction request, said transaction ordering logic being operable to determine an order of service of a plurality of transaction requests having respective transaction identifiers in dependence upon transaction ordering constraints at least partially derived from said master identifier portions of said transaction identifiers and in dependence upon said priority values of said transaction identifiers, wherein said priority value is used to derive a timeout value for servicing of a transaction request associated with said transaction identifier, wherein said timeout value is derived from concatenated values of at least part of said master identifier portions and said priority portions of said transaction identifiers.

86. A common bus carrying a transaction request signal from a master device to a first slave device, said common bus providing a plurality of communication paths between said master device, said first slave device and at least one further slave device, and for passing said transaction request signal comprising a transaction identifier having a master identifier portion and a priority request portion specifying a priority value for said transaction request, said transaction identifier enabling said first slave device to determine an order of service of a plurality of transaction requests having respective transaction identifiers in dependence upon transaction ordering constraints at least partially derived from master identifier portions of said transaction identifiers and in dependence upon said priority values of said transaction identifiers, wherein said transaction ordering constraints are partially derived from at least one of a request type of a transaction associated with said transaction identifier and a comparison of memory address ranges specified by said transaction requests.

87. A common bus carrying a transaction request signal from a master device to a first slave device, said common bus providing a plurality of communication paths between said master device, said first slave device and at least one further slave device, and for passing said transaction request signal comprising a transaction identifier having a master identifier portion and a priority request portion specifying a priority value for said transaction request, said transaction identifier enabling said first slave device to determine an order of service of a plurality of transaction requests having respective transaction identifiers in dependence upon transaction ordering constraints at least partially derived from master identifier portions of said transaction identifiers and in dependence upon said priority values of said transaction identifiers, wherein said priority value is used to derive a timeout value for servicing of a transaction request associated with said transaction identifier, wherein said timeout value is derived from concatenated values of at least part of said master identifier portion and said priority portion of said transaction identifier.

88. A data processing method for passing transaction requests from a master device to a slave device across a common communication bus providing a plurality of communication paths between said master device, said first slave device and at least one further slave device, said method comprising the steps of:
  generating in a master device a transaction identifier as part of each transaction request passed from said master device to said first slave device, said transaction identifier having a master identifier portion and a priority request portion specifying a priority value for said transaction request; and
  determining at said first slave device an order of service of a plurality of transaction requests having respective transaction identifiers in dependence upon transaction ordering constraints at least partially derived from master identifier portions of said transaction identifiers and in dependence upon said priority values of said transaction identifiers, wherein said transaction ordering constraints are partially derived from at least one of a request type of a transaction associated with said transaction identifier and a comparison of memory address ranges specified by said transaction requests.

89. A data processing method for passing transaction requests from a master device to a slave device across a common communication bus providing a plurality of communication paths between said master device, said first slave device and at least one further slave device, said method comprising the steps of:
  generating in a master device a transaction identifier as part of each transaction request passed from said master device to said first slave device, said transaction identifier having a master identifier portion and a priority request portion specifying a priority value for said transaction request; and
  determining at said first slave device an order of service of a plurality of transaction requests having respective transaction identifiers in dependence upon transaction ordering constraints at least partially derived from master identifier portions of said transaction identifiers and in dependence upon said priority values of said transaction identifiers, wherein said priority value is used to derive a timeout value for servicing of a transaction request associated with said transaction identifier, wherein said timeout value is derived from concatenated values of at least part of said master identifier portions and said priority portions of said transaction identifiers.

90. A method of generating in a master device, transaction requests for sending across a common communication bus to a first slave device, said common communications bus providing a plurality of communication paths between said master device, said first slave device and at least one further slave device, said method comprising the step of:
  generating a transaction identifier as part of each transaction request passed from said master device to said first slave device, said transaction identifier having a master identifier portion and a priority request portion specifying a priority value for said transaction request;
  wherein said transaction identifier contains information enabling said first slave device to determine an order of service of a plurality of transaction requests having respective transaction identifiers in dependence upon transaction ordering constraints at least partially derived from said master identifier portions of said transaction identifiers and in dependence upon said priority values of said transaction identifiers, wherein said transaction ordering constraints are partially derived from at least one of a request type of a transaction associated with said transaction identifier and a comparison of memory address ranges specified by said transaction requests.

91. A method of generating in a master device, transaction requests for sending across a common communication bus to a first slave device, said common communications bus providing a plurality of communication paths between said master device, said first slave device and at least one further slave device, said method comprising the step of:
  generating a transaction identifier as part of each transaction request passed from said master device to said first slave device, said transaction identifier having a master identifier portion and a priority request portion specifying a priority value for said transaction request;
  wherein said transaction identifier contains information enabling said first slave device to determine an order of service of a plurality of transaction requests having respective transaction identifiers in dependence upon transaction ordering constraints at least partially derived from said master identifier portions of said transaction identifiers and in dependence upon said priority values of said transaction identifiers, wherein said priority value is used to derive a timeout value for servicing of a transaction request associated with said transaction identifier, wherein said timeout value is derived from concatenated values of at least part of said master identifier portion and said priority portion of said transaction identifier.

92. A method of controlling a slave device to service transaction requests received from a master device across a common communication bus providing a plurality of communication paths between said master device, said first slave device and at least one further slave device, said method comprising the step of
  processing a transaction identifier received from a master device as part of a transaction request, said transaction request having a master identifier portion and a priority request portion specifying a priority value for said transaction request, said transaction ordering logic being operable to determine an order of service of a plurality of transaction requests having respective transaction identifiers in dependence upon transaction ordering constraints at least partially derived from said master identifier portions of said transaction identifiers and in dependence upon said priority values of said transaction identifiers, wherein said transaction ordering constraints are partially derived from at least one of a request type of a transaction associated with said transaction identifier and a comparison of memory address ranges specified by said transaction requests.

93. A method of controlling a slave device to service transaction requests received from a master device across a common communication bus providing a plurality of communication paths between said master device, said first slave device and at least one further slave device, said method comprising the step of:

processing a transaction identifier received from a master device as part of a transaction request, said transaction request having a master identifier portion and a priority request portion specifying a priority value for said transaction request, said transaction ordering logic being operable to determine an order of service of a plurality of transaction requests having respective transaction identifiers in dependence upon transaction ordering constraints at least partially derived from said master identifier portions of said transaction identifiers and in dependence upon said priority values of said transaction identifiers, wherein said priority value is used to derive a timeout value for servicing of a transaction request associated with said transaction identifier, wherein said timeout value is derived from concatenated values of at least part of said master identifier portions and said priority portions of said transaction identifiers.

94. A method of transmitting a transaction request on a common communications bus providing a plurality of communication paths between a master device, a first slave device and at least one further slave device comprising the steps of:

generating a transaction request signal comprising a transaction identifier having a master identifier portion and a priority request portion specifying a priority value for said transaction request, said transaction identifier enabling said first slave device to determine an order of service of a plurality of transaction requests having respective transaction identifiers in dependence upon transaction ordering constraints at least partially derived from master identifier portions of said transaction identifiers and in dependence upon said priority values of said transaction identifiers; and transmitting said transaction request signal across said common communication bus, wherein said transaction ordering constraints are partially derived from at least one of a request type of a transaction associated with said transaction identifier and a comparison of memory address ranges specified by said transaction requests.

95. A method of transmitting a transaction request on a common communications bus providing a plurality of communication paths between a master device, a first slave device and at least one further slave device comprising the steps of:

generating a transaction request signal comprising a transaction identifier having a master identifier portion and a priority request portion specifying a priority value for said transaction request, said transaction identifier enabling said first slave device to determine an order of service of a plurality of transaction requests having respective transaction identifiers in dependence upon transaction ordering constraints at least partially derived from master identifier portions of said transaction identifiers and in dependence upon said priority values of said transaction identifiers; and transmitting said transaction request signal across said common communication bus, wherein said priority value is used to derive a timeout value for servicing of a transaction request associated with said transaction identifier, wherein said timeout value is derived from concatenated values of at least part of said master identifier portions and said priority portions of said transaction identifiers.

* * * * *